United States Patent [19]
Nitschke et al.

[11] 3,957,961
[45] May 18, 1976

[54] PROCESS FOR THE PRODUCTION OF HYDROGEN/DEUTERIUM-CONTAINING GAS

[75] Inventors: Eberhard Nitschke, Do-Barop; Arvind Desai, Dortmund-Aplerbeck; Hartmut Ilgner, Dortmund, all of Germany

[73] Assignee: Friedrich Uhde GmbH, Dortmund, Germany

[22] Filed: Apr. 19, 1973

[21] Appl. No.: 352,606

[30] Foreign Application Priority Data
May 29, 1972  Germany.............................2226065

[52] U.S. Cl................................ 423/650; 423/437; 423/580; 423/652; 423/656
[51] Int. Cl.²...................... C01B 4/00; C01B 1/16; C01B 1/26
[58] Field of Search ........... 423/652, 650, 648, 580, 423/656, 437

[56] References Cited
UNITED STATES PATENTS

| | | | |
|---|---|---|---|
| 2,156,851 | 5/1939 | Hansgirg............................. | 423/580 |
| 3,019,088 | 1/1962 | Vielstich et al...................... | 423/580 |
| 3,411,884 | 11/1968 | Thayer............................... | 423/580 |
| 3,577,221 | 5/1971 | Smith et al......................... | 423/656 X |
| 3,692,477 | 9/1972 | Thayer............................. | 423/648 X |
| 3,699,218 | 10/1972 | Smith et al......................... | 423/648 |
| 3,789,112 | 1/1974 | Pachaly............................ | 423/648 X |

FOREIGN PATENTS OR APPLICATIONS
1,224,946   3/1971   United Kingdom................. 423/580

OTHER PUBLICATIONS
"Heavy Water Production", An Annotated Bibliography of Selected Literature, 1964, compiled by J. M. Jacobs, Item 153, Atom. Energy Comm.

*Primary Examiner*—Edward Stern
*Attorney, Agent, or Firm*—Malcolm W. Fraser

[57] ABSTRACT

A process for the production of hydrogen/deuterium-containing gas in which the enriched condensate obtained from the production of a hydrogen/deuterium-containing gas mixture is collected and subjected to a direct exchange of isotopes with the feedsteam admitted to the process. Such condensate can be brought into direct exchange of isotopes with the gas water vapour mixture within the process, viz. ahead of the CO conversion section. The exchange of isotopes may be performed according to the counter-current principle. If it is intended to maintain in the hydrogen/deuterium-containing gas a certain definite content of water vapour whose phase condition is superior to the condition achieved when using normal cooling water, this gas, at least 0.6 kg/m³ of gas, is subjected to an exchange of isotopes with the water fed additionally into the process.

3 Claims, 4 Drawing Figures

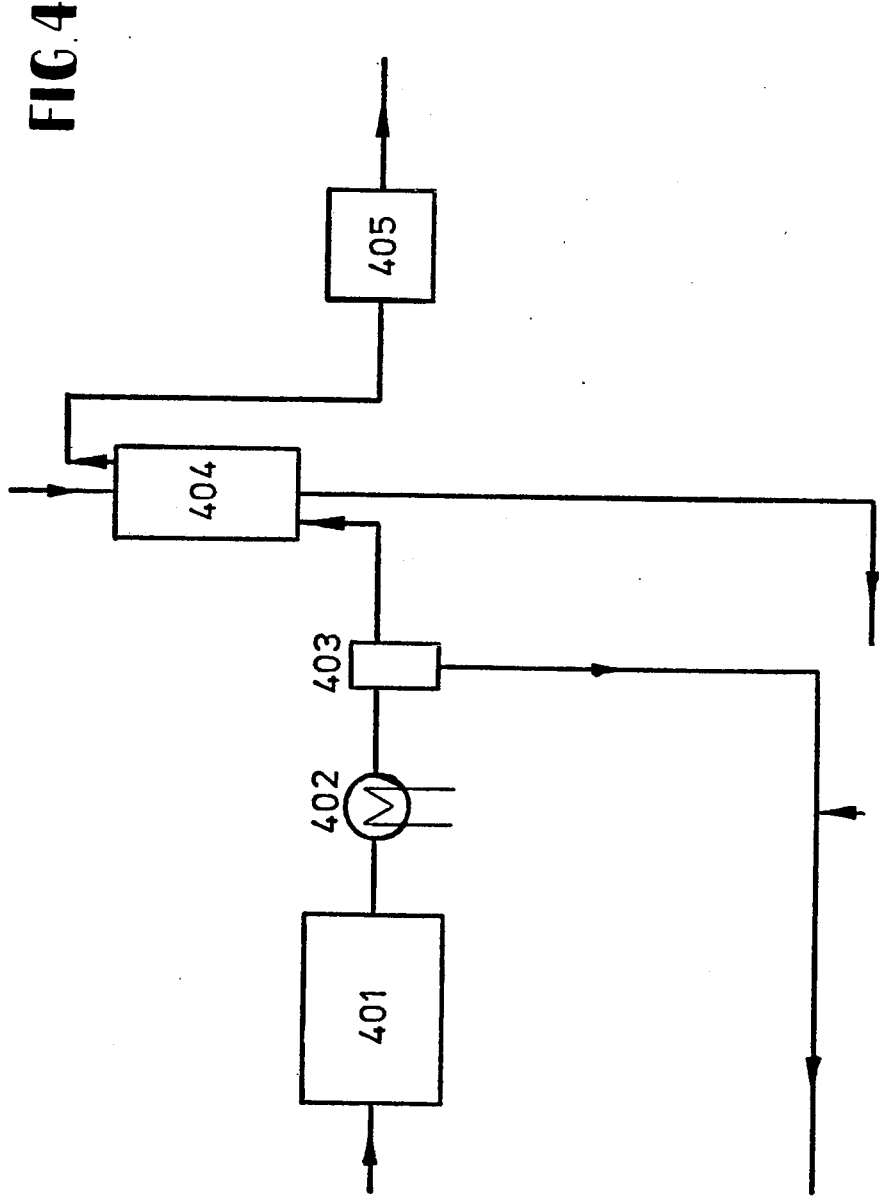

PROCESS FOR THE PRODUCTION OF HYDROGEN/DEUTERIUM-CONTAINING GAS

BACKGROUND OF THE INVENTION

The present invention relates to a process for the production of hydrogen/deuterium-containing gas from hydrocarbons or coal and steam or oxygen or oxygen-bearing gas. Such a gas serves for the recovery of deuterium, the latter being separated from the hydrogen/deuterium-containing gas in socalled deuterium enrichment plants. The hydrogen-containing gas depleted in deuterium can be further used, for example for the production of ammonia.

In these processes for the production of hydrogen/deuterium-containing gas it is necessary to attain the maximum possible deuterium concentration in the gas because the volume of process equipment, and, consequently, the costs for the recovery of the deuterium depend on said concentration.

It is known that the deuterium content of both hydrocarbons and water is almost independent from their origin. This content is commonly known as the natural deuterium content. It is in the order of 145 ppm of deuterium referred to hydrogen. The range of variation of that natural concentration does generally not exceed 5 ppm. Theoretically, the deuterium concentration in the hydrogen produced should correspond to the deuterium concentration in the hydrocarbons fed to the cracking process and to the deuterium concentration in the steam fed to the cracking process.

It is known to produce hydrogen/deuterium-containing gas by the autothermic or allothermic cracking of hydrocarbons with addition of steam and/or oxygen. Known processes also include those where this gas is produced by the gasification of coal. In any case, the gas contains carbon monoxide and carbon dioxide apart from hydrogen. In the CO-conversion step that follows the cracking process, the carbon monoxide is converted to carbon dioxide with the aid of steam while hydrogen is produced at the same time. Generally, the gas obtained in this way does not have the composition that is required for final processing.

Therefore, it is subjected to further process steps for the removal of carbon dioxide and for eliminating components harmful for the downstream process. Depending on the process pressure applied, the gas obtained can be sent to a deuterium enrichment plant either directly or after compression. This deuterium enrichment plant may be a hydrogen distillation facility or may operate along an isotope exchange process e.g. operated according to the hydrogen/ammonia or hydrogen/water system. After having been depleted of deuterium in the deuterium enrichment plant, the hydrogen is further processed, for example in an ammonia synthesis plant.

The production of deuterium or heavy water of the deuterium enrichment plant is limited by the quantity of hydrogen, the concentration of deuterium in the hydrogen fed to process, and the deuterium yield of the process.

Measurements performed on the hydrogen/deuterium-containing gas have proved that the deuterium content is substantially lower than the natural content. Readings were partly below 100 ppm. Extensive studies have evidenced that this depletion (decrease in the original deuterium content of the fed components) in deuterium of the hydrogen is attributable to an isotope exchange between hydrogen and the water vapour present in the gas. The water vapour contained in the gas mixture produced contains, indeed, substantially more deuterium than is found as natural content in the feedwater. This phenomenon was evidenced numerically by a deuterium balance. The studies also showed that this depletion occurs primarily in the carbon monoxide shift converstion. This process step involves a high portion of water vapour, and the gas temperature has dropped to a point where the isotope distribution in the hydrogen and water vapour has markedly shifted to the water vapour side. This enriched water vapour is condensed in the gas coolers downstream of the conversion section. The condensate is withdrawn and rejected because it generally contains dissolved carbon dioxide and traces of catalyst dust. The economic aspects of this depletion are evident. They involve not only a substantial loss of production but also require more elaborate separation methods because the concentration procedure in the deuterium enrichment plant starts from a feed gas that has a lower-than-natural deuterium content with a consequent rise in production costs.

It has sometimes been suggested, therefore, to reverse this depletion by returning the enriched condensate to the process, that means processing the condensate and returning it to the vaporizers.

As mentioned before, this method would require the return of all condensate to the cracking process, that means the water would first have to be sent through a water treatment plant. This treatment plant would be a very complicated and voluminous facility because of the $CO_2$ content and the presence of other components, such as sulphur, catalyst dust, etc. Feedsteam for the gas production unit is generally waste steam, i.e. it was produced as superheated steam of about 100 atm.g. in the wasteheat sections of the total plant and reduced in expansion turbines to the process pressure of the gas production unit. The feedwater and steam, respectively, for such waste heat sections and machines must be of high quality.

SUMMARY OF THE INVENTION

The object of the present invention is to eliminate the drawbacks outlined above. This object is achieved by collecting the enriched condensate obtained from the production of a hydrogen/deuterium-containing gas mixture, and subjecting it to a direct exchange of isotopes with the feedsteam admitted to the process.

It is another feature of the invention that this condensate can be brought into direct exchange of isotopes with the gas/water vapour mixture within the process, viz. ahead of the CO conversion section.

To achieve the maximum possible enrichment or transfer of the deuterium content of the condensate into the steam, it is another feature of the invention to perform the exchange of isotopes according to the countercurrent principle.

If, for reasons of process technology, it is intended to maintain in the hydrogen/deuterium-containing gas a certain definite content of water vapour whose phase condition is superior to the condition achieved when using normal cooling water, it is another feature of the invention to subject this gas containing a high amount of water vapour, at least 0.6 kg/m$^3$ of gas, to an exchange of isotopes with the water fed additionally into the process.

This deuterium-enriched make-up water can either be admixed to the condensate from an upstream stage or to the feedsteam admitted to the overall process.

The invention incorporates the particular advantage that the counter-current flow of deuterium-enriched condensate and feedsteam admitted to the overall process ensures an almost equal deuterium concentration of both phases leaving the counter-current column. The exchange of isotopes is achieved between the enriched condensate and the steam according to the equilibrium

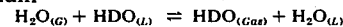

In this equation, (G) denotes the gas phase, (L) the liquid phase. The equilibrium between the two components - the gas-phase water and the liquid-phase water - depends on the ratio $P(HDO)/P(H_2O)$. At the high temperatures prevailing in this process, the ratio is near unity. According to Kirshenbaum "Physical properties of heavy water" (New York 1951, page 25) the ratio may be, for example, 1.007 at 170°C. The countercurrent flow of the two phases ensures that the effluent condensate has practically the same deuterium concentration as the steam admitted to the exchange column. Consequently, deuterium losses through condensate discharge are reduced to a minimum.

If a chemical scrubbing unit is used for the removal of $CO_2$ from the hydrogen/deuterium-containing gas, the gas mixture is admitted to this scrubbing unit at a temperature of approximately 120°C. Obviously, the gas mixture contains a considerable portion of water vapour. If this portion of water vapour with its higher-than-natural deuterium content was fed into the $CO_2$ scrubbing facility this deuterium would be lost. The gas mixture to be purified is subjected to a direct contact with the liquid scrubbing agent.

The water balance of the chemical scrubbing unit would require condensate and/or water vapour with a higher-than-natural deuterium content to be rejected into the wastewater and atmosphere, respectively. With the aid of the exchange column ahead of the $CO_2$ scrubbing unit it is possible to achieve a transfer of deuterium from the water vapour of the gas mixture to the water fed to the exchange column.

BRIEF DESCRIPTION OF THE DRAWINGS

FIG. 4 is a diagram illustrating an alternative process in which the process for the production of hydrogen is along the principles shown in FIGS. 1, 2 or 3, except that the gas fed to the $CO_2$ scrubber has a temperature of 120°C. and the gas mixture leaving the CO conversion section is cooled to about 120°C.

DESCRIPTION OF THE PREFERRED EMBODIMENTS

Figure 1:
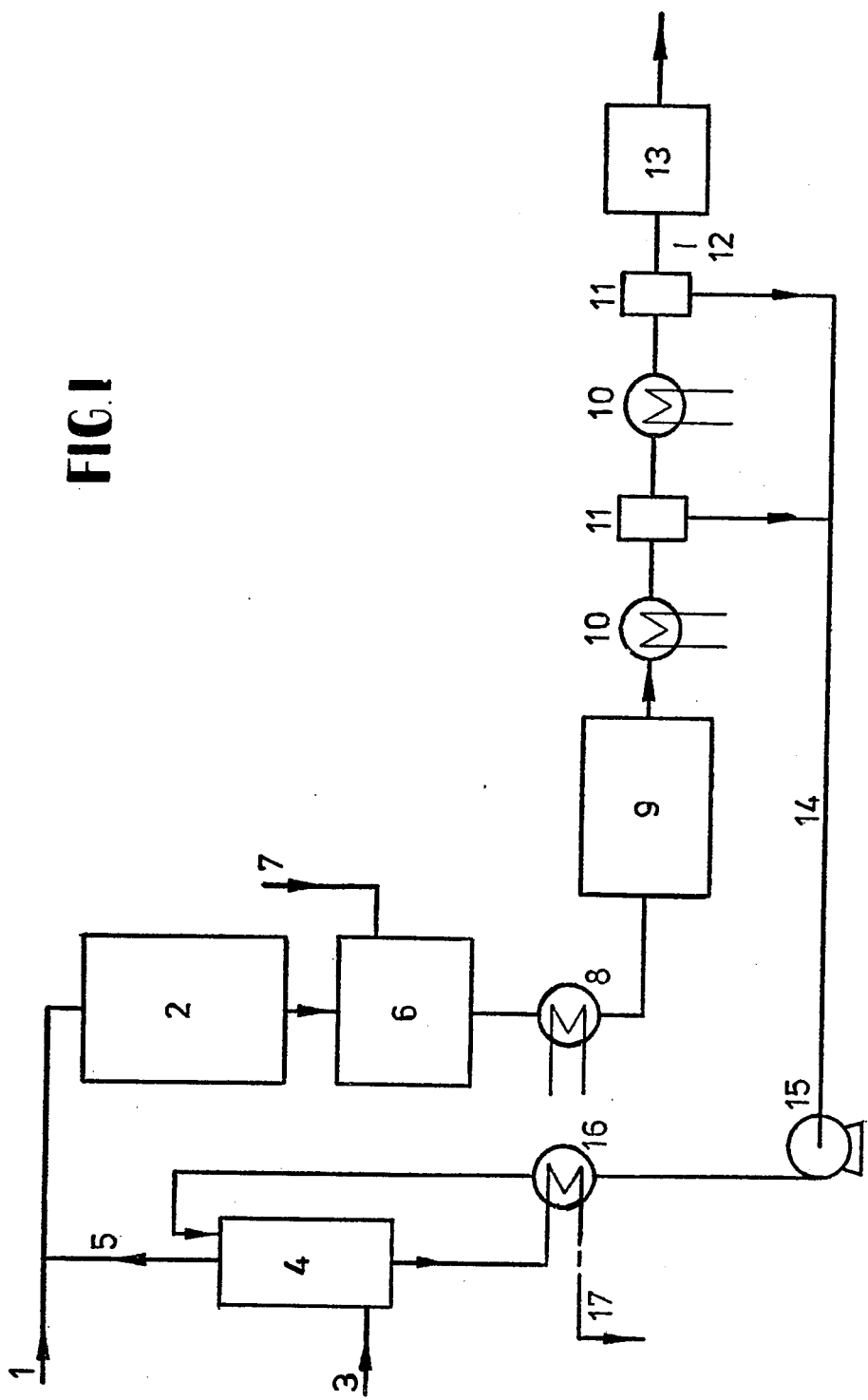
FIG. 1 is a diagram illustrating the process in which hydrocarbons are used as feedstock, for example light naphtha.

The process route according to the present invention may be explained by the following example. FIG. 1, in which hydrocarbons are used as feedstock. The preheated hydrocarbons, for example light naphtha as used in this case, are fed through line 1 to the reaction unit 2, which is a cracking furnace in this case. The steam required for the cracking process is first fed through line 3 to exchange column 4, where enrichment with deuterium takes place as claimed by this invention. The steam is then admixed to the hydrocarbons through line 5. The process gas leaves cracking furnace 2 and is subjected to more severe cracking in final cracking furnace 6, to which air is admitted through line 7. The process gas is then cooled in heat exchanger 8 before it is sent to the CO conversion unit 9, where steam with carbon monoxide is converted to hydrogen and carbon dioxide. The gas leaving the conversion unit is cooled in heat exchangers 10. The condensate from this process step is retained in separators 11. The gas, which is now at ambient temperature still contains a small amount of water vapour that corresponds to its temperature, said water vapour being still enriched with deuterium whose quantity is, however, insignificant as compared to the expenses required for its recovery. The gas cooled to ambient temperature passes through line 12 into carbon dioxide scrubbing unit 13 and further to the enrichment plant. The condensate is sent through line 14 to booster pump 15 and passes through heat exchanger 16 to the top of exchanger column 4. In this column, the condensate transfers its deuterium to the steam as reflected by the equilibrium conditions. The depleted condensate leaves the column through line 17 and may be rejected after being heat-exchanged against the incoming condensate in heat exchanger 16.

Figure 2:
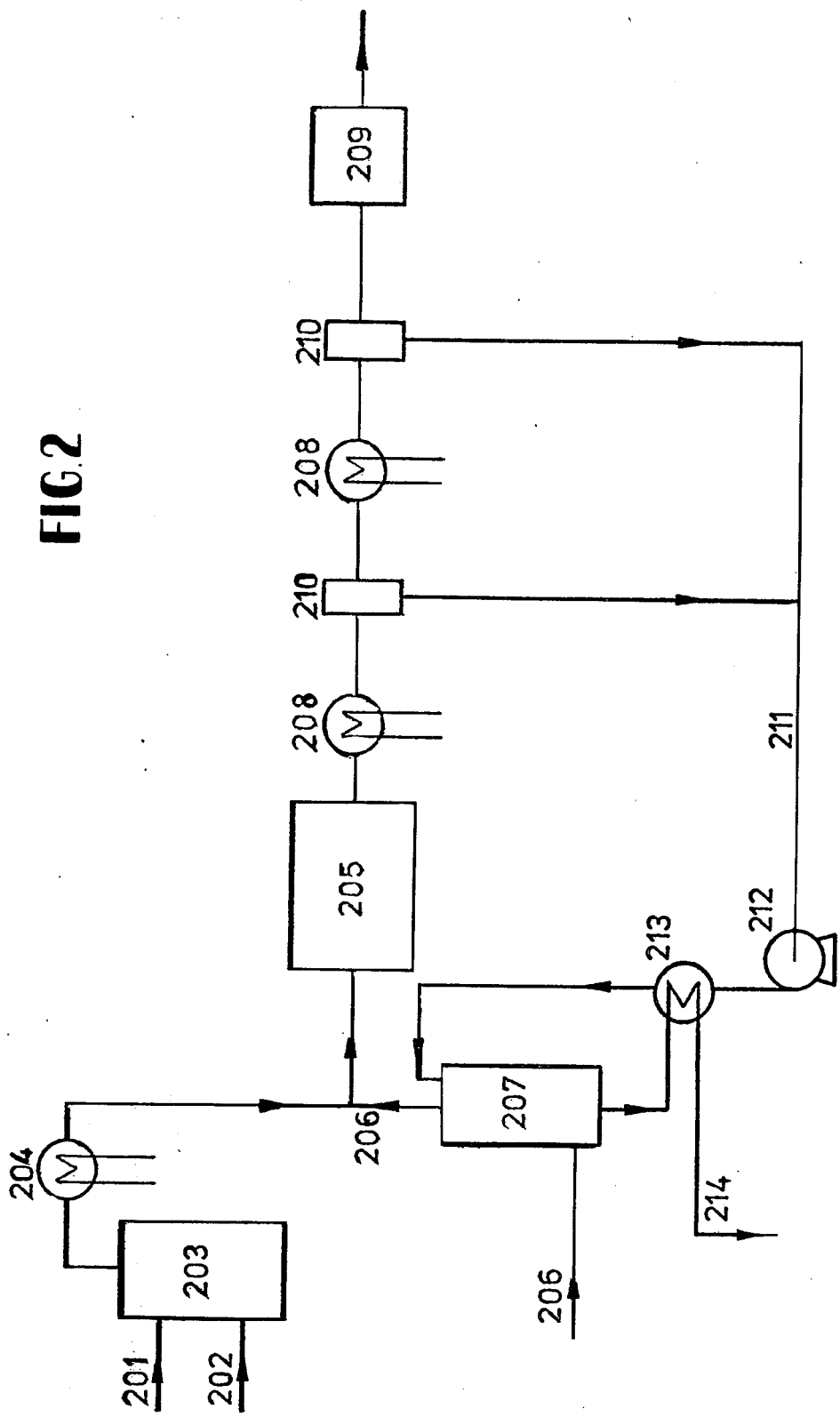
FIG. 2 is a diagram illustrating an alternative process in which the hydrocarbons may be in the form of heavy fuel oil or solid carbon in the form of coal.

Another process route is illustrated in FIG. 2. The hydrocarbons, for example heavy fuel oil or even solid carbon in the form of coal, pass to gasification unit 203 through line 201 while oxygen is admitted through line 202. The gas leaving the gasification unit is cooled in heat exchanger 204 before it is sent to CO conversion section 205. The steam required for the conversion reaction is admitted through line 206. To maintain a favourable deuterium balance, this steam was contacted in exchange column 207 with deuterium enriched condensate. The temperature of the gas mixture leaving the CO conversion section is lowered in cooler 208, and the gas is sent to carbon dioxide scrubbing section 209. The condensate retained in separators 210 is withdrawn through line 211 and is sent through pump 212 and heat exchanger 213 to exchange column 207. The depleted condensate leaves the exchange column through line 214.

Figure 3:
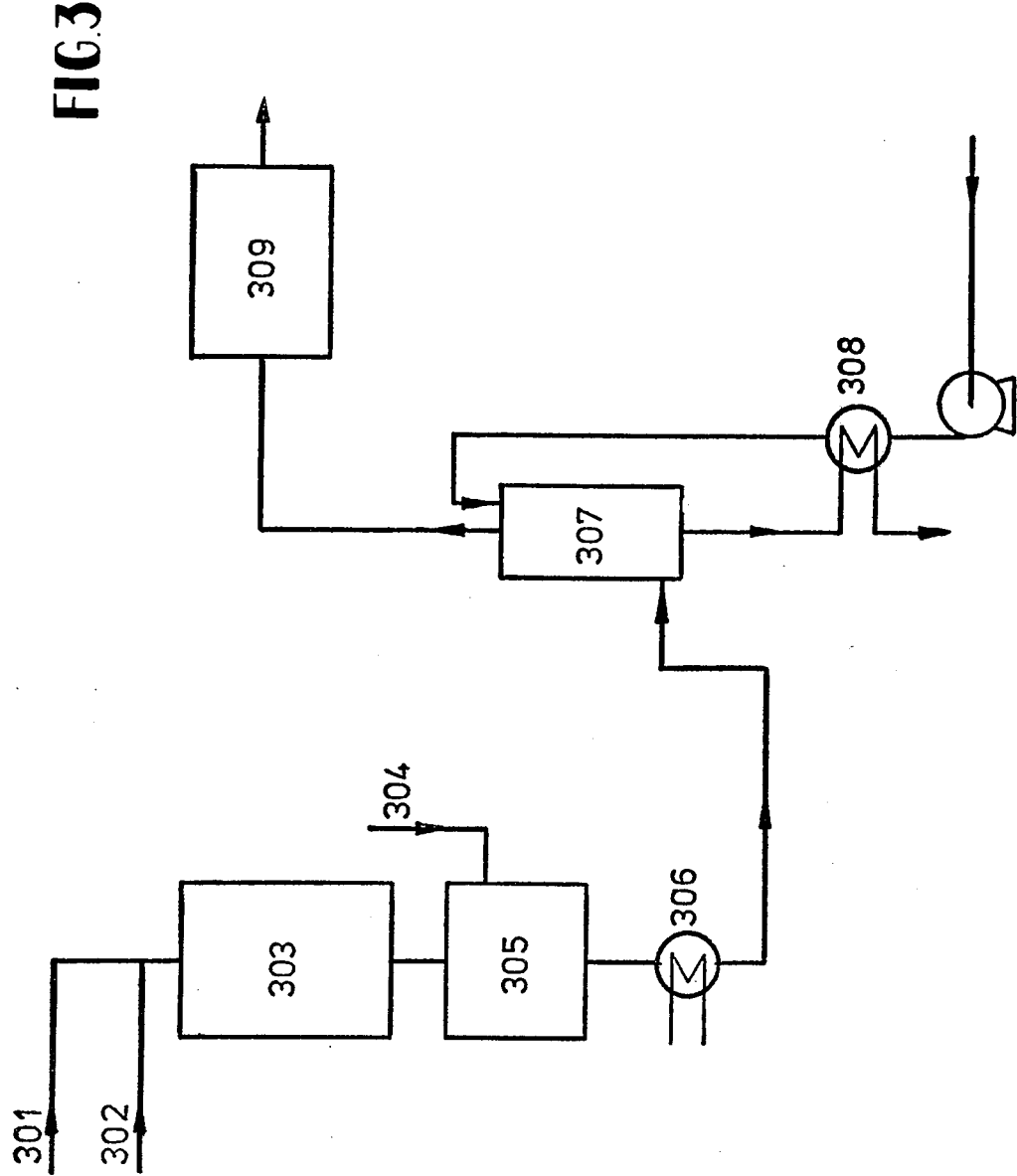
FIG. 3 is a diagram illustrating an alternative process operating along the same route as FIG. 1 in which hydrocarbons and steam are fed to a cracking furnace.

FIG. 3 illustrates another alternative of the invention. The process for the production of hydrogen operates along the same route as shown in FIG. 1. Hydrocarbons and steam are fed through lines 301 and 302 to cracking furnace 303. More severe cracking takes place in final cracking furnace 305 to which air or oxygen is admitted through line 304. In heat exchanger 306, the gas is cooled to a level above its dew point. Deuterium-containing condensate originating from a down-stream process step where the temperature drops below the dew point is admitted to exchange column 307 where it is contacted with the water vapour contained in the gas. This exchange process, therefore, results in a depletion of the condensate and an enrichment of the steam. The exchange process is restricted to the water vapour contained in the gas while the other gaseous components behave like an inert gas. The depleted condensate leaving the exchange column yields its heat in heat exchanger 308 to the condensate fed to the exchange column before being rejected. The gas/water vapour mixture from the exchange column passes to CO conversion section 309 for being subjected to the usual CO conversion. Further treatment and utilization are the same as shown in FIG. 1 or 2.

Another process route according to this invention is shown in FIG. 4. The process for the production of hydrogen operates along the principles shown in FIGS. 1, 2, or 3, except that the gas fed to the $CO_2$ scrubbing section shall have a temperature of about 120°C. The gas mixture leaving CO conversion section 401 is cooled to about 120°C in cooler 402, which may also serve as a reboiler for the scrubbing agent for $CO_2$ removal. Condensate retained in separator 403 is withdrawn and, as shown in FIGS. 1, 2, and 3, is sent through the pump and heat exchanger referred to in said Figures to exchange column 4 or 207 or 308 for deuterium depletion. According to the invention, the gas mixture leaving separator 403 and whose water vapour portion has a high content of deuterium is sent to exchange column 404. A significant loss of deuterium would be encountered if this portion of water vapour was neglected. In exchange column 404 ahead of the $CO_2$ scrubbing section, the gas mixture is contacted with the water admitted to the overall process for reasons of material balance.

The gas mixture is fed to the bottom of the column while water is admitted at the top. Due to the difference in deuterium concentration—concentration in the water vapour portion is higher than in the water—an exchange takes place again, which tends towards unity. The water vapour portion of the gas mixture going to $CO_2$ scrubbing section 405 is depleted in deuterium while the effluent water from the exchange column is enriched in deuterium. This water may now be admixed either to the deuterium-containing condensate from the overall process or to the process feedsteam.

A calculation referring to a plant for the production of 75.00 $Nm^3$/hr. of hydrogen has evidenced that the theoretical deuterium content of the starting components drops to 110 ppm and less if the methods described above are not applied. At a process yield of 85%, this corresponds to a production of 49.2 tons/year of $D_2O$. Through the application of the process routes according to this invention the deuterium content can be maintained at a level of at least 143 ppm. This achievement results in a production of 64 tons/year. The process routes outlined in this invention require relatively moderate technical expenses because the equipment involved comprises only an exchange column, a heat exchanger, a pump, piping and valves, and ensure an increase in production by almost 30%.

What we claim is:

1. A process for the production of manufactured hydrogen gas rich in naturally occurring deuterium by a method comprising in sequence the steps of:
   I. reacting hydrocarbons, oxygen and steam in an elevated temperature zone to produce a process gas which contains carbon monoxide, water vapor, and hydrogen;
   II. passing the process gas through a carbon monoxide converter zone to change the carbon monoxide to carbon dioxide which gives a modified process gas which consists of carbon dioxide, water vapor and hydrogen;
   III. cooling the modified process gas to achieve a gaseous component which consists of carbon dioxide, hydrogen and residual water vapor and a condensate which is water with some carbon dioxide and impurities dissolved in it;
   IV. separating the two phases in a separation zone;
   V. conveying the condensate to the top of an exchange column;
   VI. introducing steam into the bottom of the exchange column;
   VII. contacting the condensate with the steam in the exchange column employing countercurrent mass transfer to achieve an equilibrium of concentration of deuterium, the deuterium in the condensate equilibrates to the steam which enriches the steam in deuterium and depletes the water of deuterium thereby producing steam rich in deuterium;
   VIII. conveying the steam rich in deuterium to Step I.
   IX. conducting the gaseous component of Step III to a carbon dioxide scrubbing zone;
   X. removing the carbon dioxide from the gaseous component leaving manufactured hydrogen gas rich in naturally occurring deuterium.

2. A process for the production of manufactured hydrogen gas rich in naturally occurring deuterium by a method comprising in sequence the steps of:
   I. reacting hydrocarbons, oxygen and steam in an elevated temperature zone to produce a process gas which contains carbon monoxide, water vapor, and hydrogen;
   II. insuring that enough steam is introduced to have water vapor which is 0.6 $kg/m^3$ of the process gas;
   III. passing the process gas through a carbon monoxide converter zone to change the carbon monoxide to carbon dioxide which gives a modified process gas which consists of carbon dioxide, water vapor and hydrogen;
   IV. cooling the modified process gas to achieve a gaseous component which consists of carbon dioxide, hydrogen and residual water vapor and a condensate which is water with some carbon dioxide and impurities dissolved in it;
   V. separating the two phases in a separation zone;
   VI. conveying to condensate to the top of an exchange column;
   VII. introducing steam into the bottom of the exchange column;
   VIII. contacting the condensate with the steam in the exchange column employing countercurrent mass transfer to achieve an equilibrium of concentration of deuterium, the deuterium in the condensate exchanges to the steam which enriches the steam in deuterium and depletes the water of deuterium thereby producing steam rich in deuterium;
   IX. conveying the steam rich in deuterium to Step I;
   X. conducting the gaseous component of Step IV to a carbon dioxide scrubbing zone;
   XI. removing the carbon dioxide from the gaseous component leaving manufactured hydrogen gas rich in naturally occurring deuterium.

3. A process of claim 1 for production of manufactured hydrogen rich in gas naturally occurring deuterium by a method comprising in sequence the steps of:
   I. reacting hydrocarbons, oxygen and steam in an elevated temperature zone to produce a process gas which contains carbon monoxide, water vapor, and hydrogen;
   II. passing the process gas through a carbon monoxide converter zone to change the carbon monoxide to carbon dioxide which gives a modified process gas which consists of carbon dioxide, water vapor and hydrogen;

III. cooling the modified process gas to approximately 120°C to achieve a gaseous component which consists of carbon dioxide, hydrogen and residual water vapor and a condensate which is water with some carbon dioxide and impurities dissolved in it;

IV. separating the two phases in a separation zone;

V. conveying the condensate to the top of an exchange column;

VI. introducing steam into the bottom of the exchange column;

VII. contacting the condensate with the steam in the exchange column employing countercurrent mass transfer to achieve an equilibrium of concentration of deuterium, the deuterium in the condensate equilibrates to the steam which enriches the steam in deuterium and depletes the water of deuterium thereby producing steam rich in deuterium;

VIII. conveying the steam rich in deuterium to Step I;

IX. leading the gaseous component which consists of carbon dioxide, hydrogen, and residual water vapor to an exchange column;

X. introducing water at the top of the exchange column;

XI. achieving in the exchange column by employing countercurrent mass transfer an equilibrium of concentration of deuterium in the water vapor of the gaseous component to the water; thereby enriching the water with deuterium and depleting the gaseous component;

XII. conducting the depleted gaseous component which consists of carbon dioxide and hydrogen to a carbon dioxide scrubber zone;

XIII. removing the carbon dioxide from the gaseous component leaving manufactured hydrogen gas rich in naturally occurring deuterium.

* * * * *